US012491708B2

(12) United States Patent
Gardner, Jr. et al.

(10) Patent No.: US 12,491,708 B2
(45) Date of Patent: Dec. 9, 2025

(54) METHOD AND APPARATUS FOR PRODUCING EMBOSSED IMAGES AND TEXT

(71) Applicant: ViewPlus Technologies, Inc., Corvallis, OR (US)

(72) Inventors: John A. Gardner, Jr., Corvallis, OR (US); Daniel Taylor Gardner, Corvallis, OR (US)

(73) Assignee: ViewPlus Technologies, Inc., Corvallis, OR (US)

( * ) Notice: Subject to any disclaimer, the term of this patent is extended or adjusted under 35 U.S.C. 154(b) by 0 days.

(21) Appl. No.: 18/446,639

(22) Filed: Aug. 9, 2023

(65) Prior Publication Data

US 2024/0246332 A1 Jul. 25, 2024

Related U.S. Application Data

(60) Provisional application No. 63/481,449, filed on Jan. 25, 2023.

(51) Int. Cl.
*B41F 19/02* (2006.01)
*B41M 3/16* (2006.01)

(52) U.S. Cl.
CPC ............... *B41F 19/02* (2013.01); *B41M 3/16* (2013.01)

(58) Field of Classification Search
CPC .................................. B41F 19/02; B41M 3/16
See application file for complete search history.

(56) References Cited

U.S. PATENT DOCUMENTS

| | | | | |
|---|---|---|---|---|
| 4,676,676 | A | 6/1987 | Bitoh | |
| 5,193,921 | A | 3/1993 | Tsukuda et al. | |
| 5,204,802 | A | 4/1993 | Howes, Jr. et al. | |
| 5,222,819 | A | 6/1993 | Tsukuda et al. | |
| 5,313,256 | A | 5/1994 | Boy, Jr. et al. | |
| 5,823,691 | A | 10/1998 | Langner | |
| 6,766,733 | B1 * | 7/2004 | Collins ..................... | B26F 1/44 101/372 |
| 7,771,187 | B2 * | 8/2010 | Gregerson ............ | B29C 51/082 425/398 |

FOREIGN PATENT DOCUMENTS

| | | | | |
|---|---|---|---|---|
| KR | 100435708 | B1 | * | 6/2002 |
| KR | 20110090545 | A | * | 2/2010 |
| KR | 20220059797 | A | * | 11/2020 |

* cited by examiner

*Primary Examiner* — Christopher E Mahoney
*Assistant Examiner* — Marissa Ferguson-Samreth
(74) *Attorney, Agent, or Firm* — Chernoff, Vilhauer, McClung & Stenzel LLP

(57) ABSTRACT

An embossing device and method, which can produce traditional braille cells and crisp, well-defined, raised images of graphical subjects is disclosed. Embossing of sheet material is accomplished using punches which have embossing faces shaped to mate with recessed areas on the surface of a platen.

14 Claims, 23 Drawing Sheets

METHOD AND APPARATUS FOR PRODUCING EMBOSSED IMAGES AND TEXT

TECHNICAL FIELD

The present invention relates to a method and apparatus for embossing paper or other mediums, particularly to produce images to be read by persons who are visually impaired.

BACKGROUND OF INVENTION

Automated embossing systems are primarily used for embossing letters or dots into a sheet of paper or plastic material, such as for embossing lettering into credit card blanks. Embossing is accomplished using punches, chisels, and/or roller punches, referred collectively as tools. These tools usually have embossing faces which are shaped to mate with recessed areas on the surface of a platen or die. In order to emboss a medium, such as paper, with the embossing tools, a certain minimum force must be applied to overcome the resistance of the medium. This force is supplied most efficiently by an electromechanical device such as a solenoid. Other actuators, such as pneumatic cylinders, could be used to drive the tools as well, but solenoids are less expensive, smaller, and more reliable.

A typical embosser is capable of producing dots and line segments having an embossed height of about 0.5 mm, with dots having vertical and horizontal spacings of about 1.27 mm. Among these products are braille printers which use embossing heads that produce patterns of embossed dimples, dots, and/or lines usually corresponding to the traditional six- or eight-dot braille alphabet and/or DotsPlus braille system. Prior embossing machines are described in U.S. Pat. Nos. 4,676,676; 5,193,921; 5,204,802; 5,222,819; 5,313,256; and 5,823,691.

Such prior devices have not, however, been suitable for producing both high resolution graphical images and braille cells which can be easily read by a visually impaired person. U.S. Pat. No. 5,823,691 discloses a high-resolution braille and tactile graphics embosser where the embossed dots and lines are confined to preset locations on a square grid—or matrix—which requires lines, especially diagonal lines, to be represented jaggedly (such as by zigzag) and additionally limits the resolution of images.

What is desired then, is an embossing apparatus that can be arbitrarily positioned free of a grid to generate high-resolution, crisp, and well-defined embossed images and smooth lines in the embossed medium.

SUMMARY OF INVENTION

The present invention includes, in one of its embodiments, an embossing device which can provide arbitrarily positioned grid-free high-resolution embossed images in a suitable medium, such as stiff paper. One of its embodiments may also produce embossed images and text as well as traditional six- or eight-dot braille cells and DotsPlus braille.

To emboss a medium, a tool, such as a punch, chisel, and/or roller punch, is positioned above a die with a tool interface. In one embodiment, the tool interface is comprised of two recessed channels running perpendicular to one another to create a '+' shape. The medium to be embossed is inserted between the tool interface and the tool. The tool is pressed into the interface, which deforms the medium according to the shape of the tool and how it is positioned in the interface. For example, a chisel may be positioned over one the of the perpendicular channels such that, when the tool is pressed into the interface, it embosses a line in the medium.

To arbitrarily position the embossing tool and die, the tool and die are arranged in a carriage that is slidably engaged with the larger embossing apparatus or machine such that they can be positioned over any part of the medium along the sliding axis. The medium may also be fed through the device both backward and forward and its movement may be arrested to position the tool and die along an axis perpendicular to the sliding axis. The die and tool may also be rotated within the carriage such that line segment may be oriented at any angle with respect to one another.

BRIEF DESCRIPTION OF THE DRAWINGS

For a better understanding of the invention, and to show how the same may be carried into effect, reference will now be made, by way of example to the accompanying drawings, of which.

DETAILED DESCRIPTION OF PREFERRED EMBODIMENTS

Unless context requires otherwise, the terms "substantially," "approximately," "about," and the like mean "exactly or reasonably close to" the descriptor they modify. Thus, the embodiments described herein are not necessarily limited to recited values, directions, or other descriptors, but rather also include reasonably close deviations.

As used herein, "and/or" means any one or more of the items in the list. Thus "x, y, and/or z" means any of the following elements of the seven-element set {(x), (y), (z), (x, y), (x, z), (y, z), (x, y, z)}. Similarly, "such as," "example," "e.g.," and the like are intended to convey that the listed examples are illustrative and non-exclusive to other possibilities.

The preferred embosser can be used to impress raised areas, such as crisp, sharp dots and line segments. These raised areas can be impressed on braille paper, inexpensive plastic sheets, or any other medium which can be deformed by punches, and which holds its shape thereafter.

The preferred embosser in many ways can operate similarly to a traditional inkjet printer, can be constructed using components, such as drive mechanisms and electrical controls, which are commonly found in inkjet printers. Such commonly known elements are not described here in detail since they are familiar to those skilled in the art. Unlike traditional inkjet printers, where cartridges of ink are arranged for movement back and forth across a page, the preferred embosser uses a combination of embossing tools and dies arranged in a carriage which moves back and forth across the embossing medium.

Figure 1:
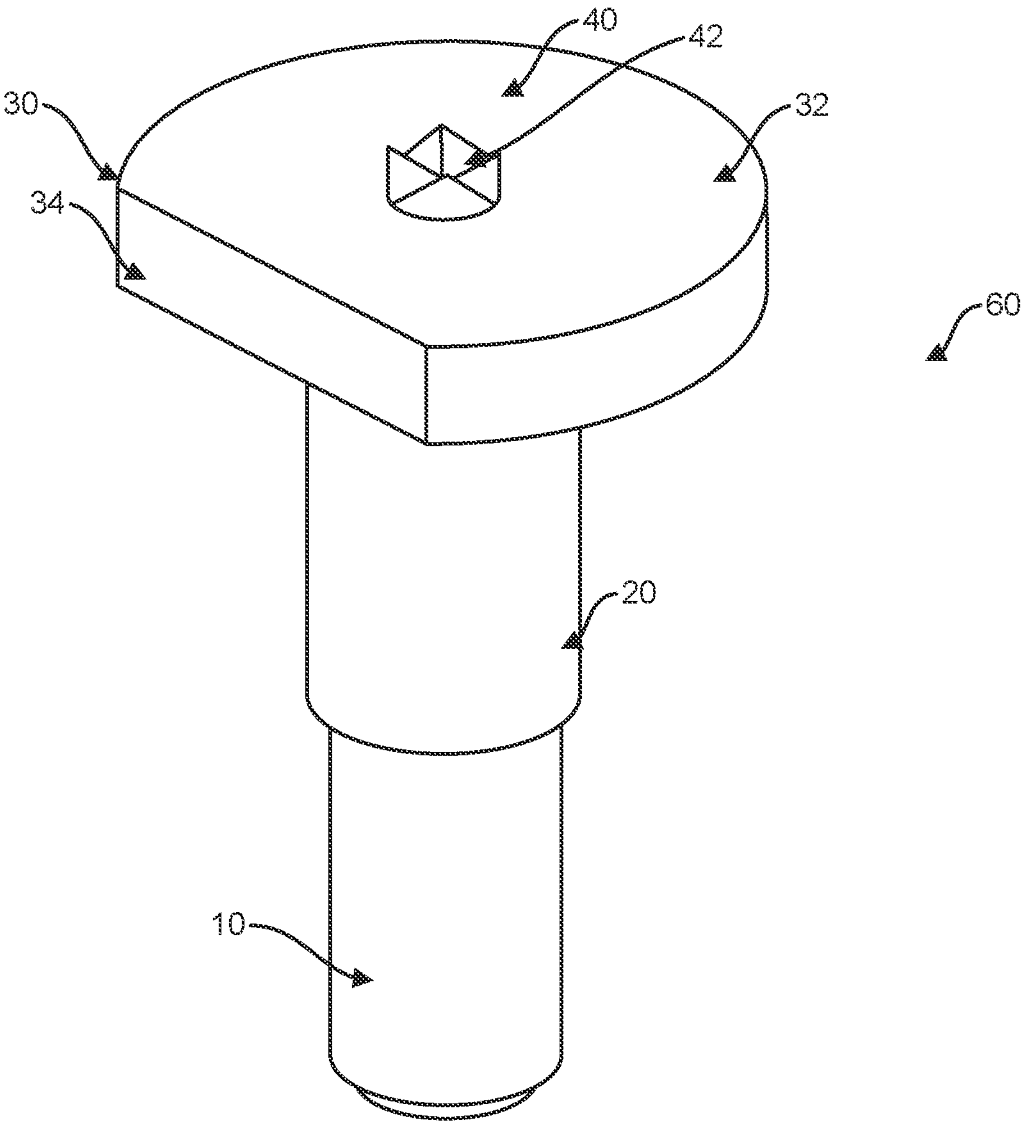
FIG. 1 is a perspective view of a die of the present disclosure depicting a die with raised channels to create a tool interface on top.
Figure 2:
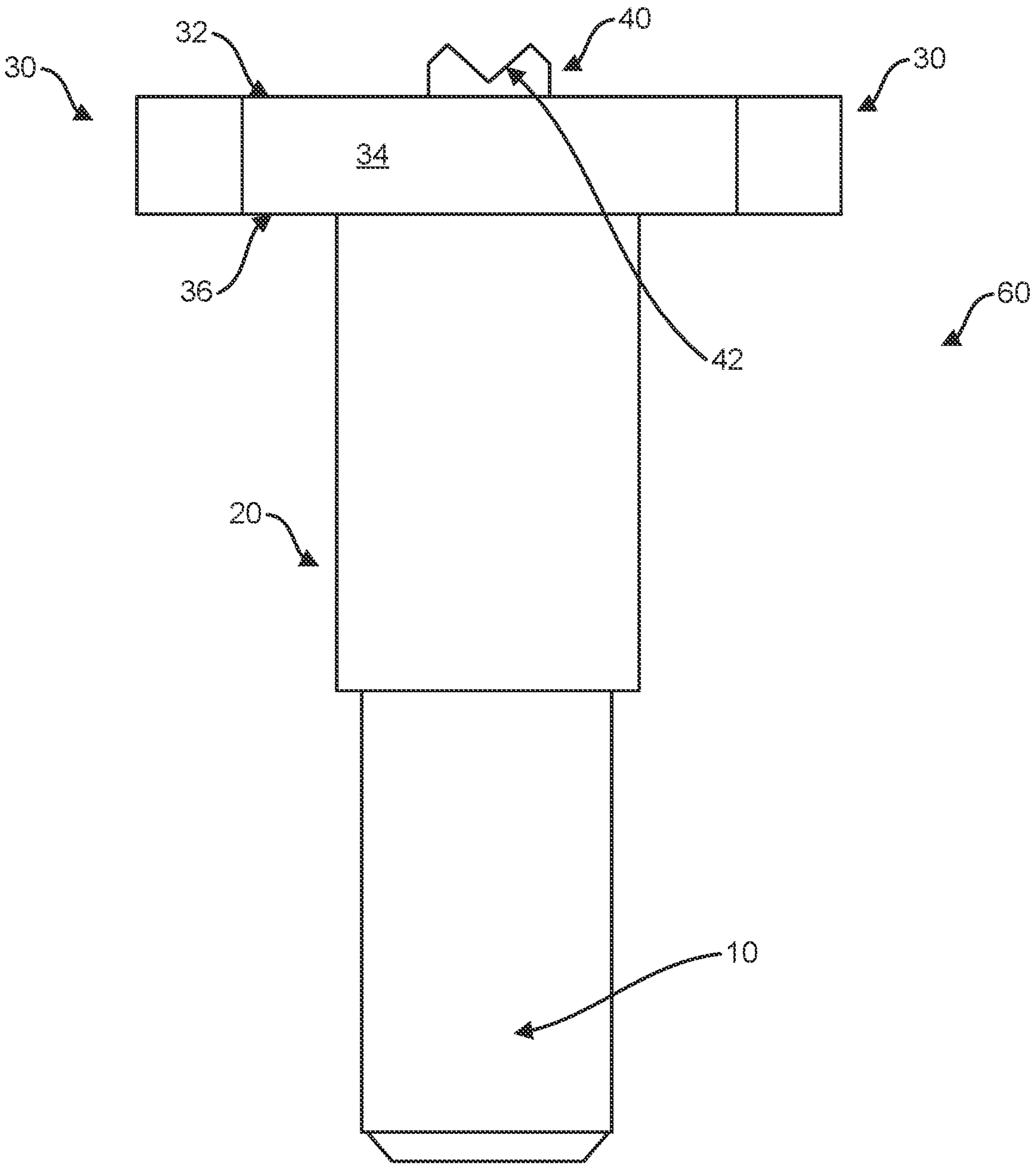
FIG. 2 is a side view of the die of FIG. 1.

Referring to FIGS. 1 and 2, a first preferred embodiment of a die 60 includes a lower shank 10, an upper shank 20, a cylindrical head 30, and a tool interface 40 on an upper circular face 32 of the head 30. The head 30 of the illustrative embodiment of FIGS. 1 and 2 is cylindrical with a diameter greater than its height. A section of the cylinder may be removed along a plane perpendicular to the upper circular face 32 to create a flat edge 34 that extends from a lower circular face 36 to the upper circular face 32 of the head 30. The flat edge 34 may inhibit the die 60 from rotating undesirably when positioned in a carriage 50 (see, e.g., FIG. 3). Other embodiments may utilize a head 30 that is a rectangular prism or any other suitable geometric shape to create an upper surface upon which a tool interface 40 may be positioned and/or inhibit undesired rotation. Still other embodiments may not include a head at all, with the tool interface 40 positioned directly on the upper shank 20. Other embodiments of the die 60 may not include any shank at all.

The tool interface 40 of the preferred embodiment of FIGS. 1 and 2 is comprised of a raised member that extends from the upper circular face 32 of the head 30. Two V-shaped channels 42 perpendicularly oriented with respect to each other cross through the raised area. The angle of V in the channels 42 is preferably between 45 and 90 degrees, more preferably between 65 and 90 degrees, or still more preferably between 85 and 90 degrees. The preferred embodiment depicted in FIGS. 1 and 2 uses an angle of 90 degrees for the V-shaped channels 42. One benefit of this crossing-channels design is that a variety of embossing tools may be used. Chisels may be used to make line segments and punches to make dots. Punches may be cones, pyramids, or any shape suitable to interface with the tool interface 40.

Other embodiments of the tool interface 40 may use more channels 42. For example, an additional two channels 42 may be perpendicularly oriented to one another, but rotationally offset by 45 degrees from the original channels 42 to create an eight-pointed star tool interface 40 permitting diagonal line segments as well as vertical and horizontal lines.

Figure 3:
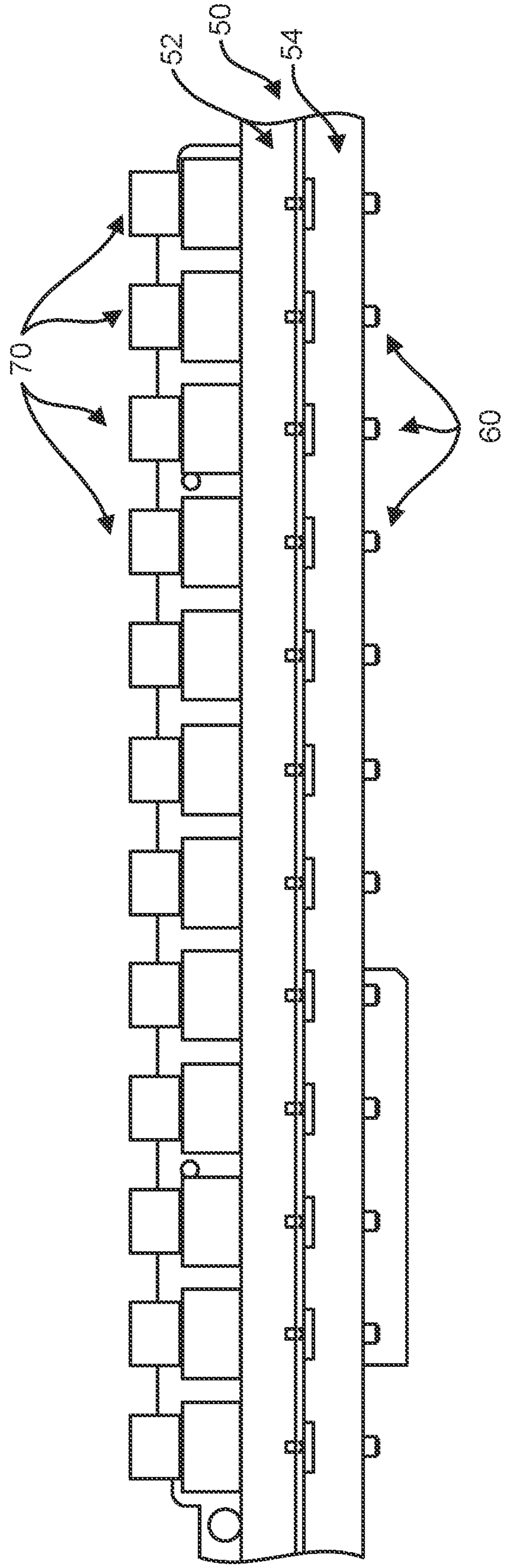
FIG. 3 is a side view of a carriage with dies and tools arranged according to one embodiment of the present disclosure.

The lower shank 10 and upper shank 20 of the preferred embodiment of FIGS. 1 and 2 may be cylindrical or may be rectangular prisms or any geometric shape suitable for positioning in a carriage 50 (see, e.g., FIG. 3). The lower shank 10 may be thinner than the upper shank 20 to further assist in positioning within the carriage 50. The lower shank 10 may be threaded (see FIGS. 6-16).

Figure 4:
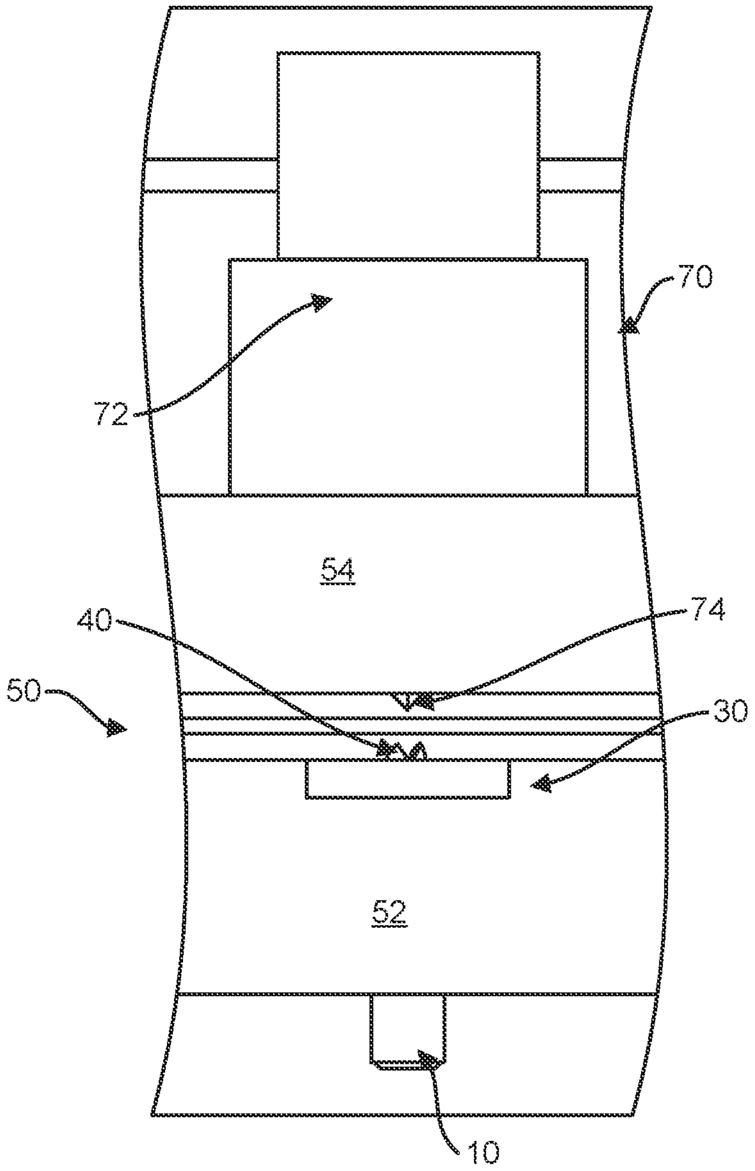
FIG. 4 is an expanded view of one of the dies and tools of the carriage of FIG. 3 with the tool, specifically a punch, poised above the die.
Figure 5:
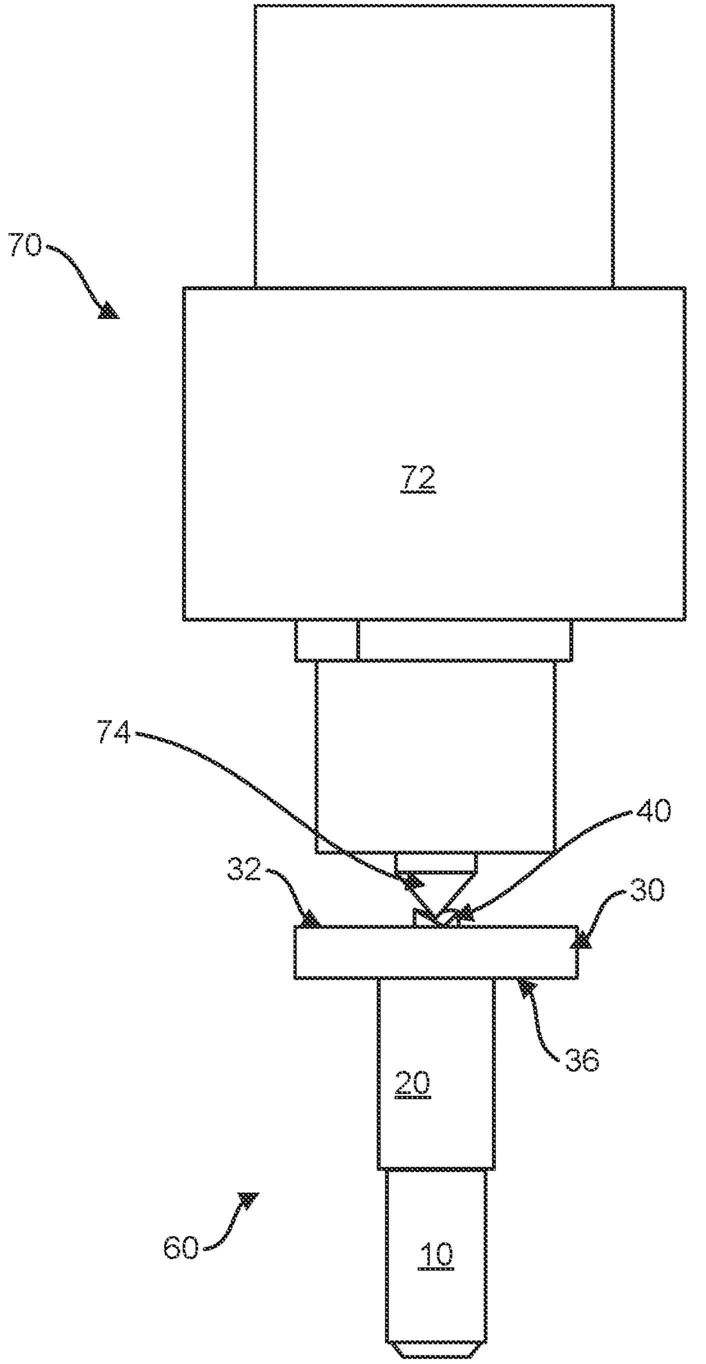
FIG. 5 is an expanded view of the die and tool of FIG. 4 with the carriage stripped away to better see the die and tool. In the drawing, the tool is interfaced with the die.
Figure 6:
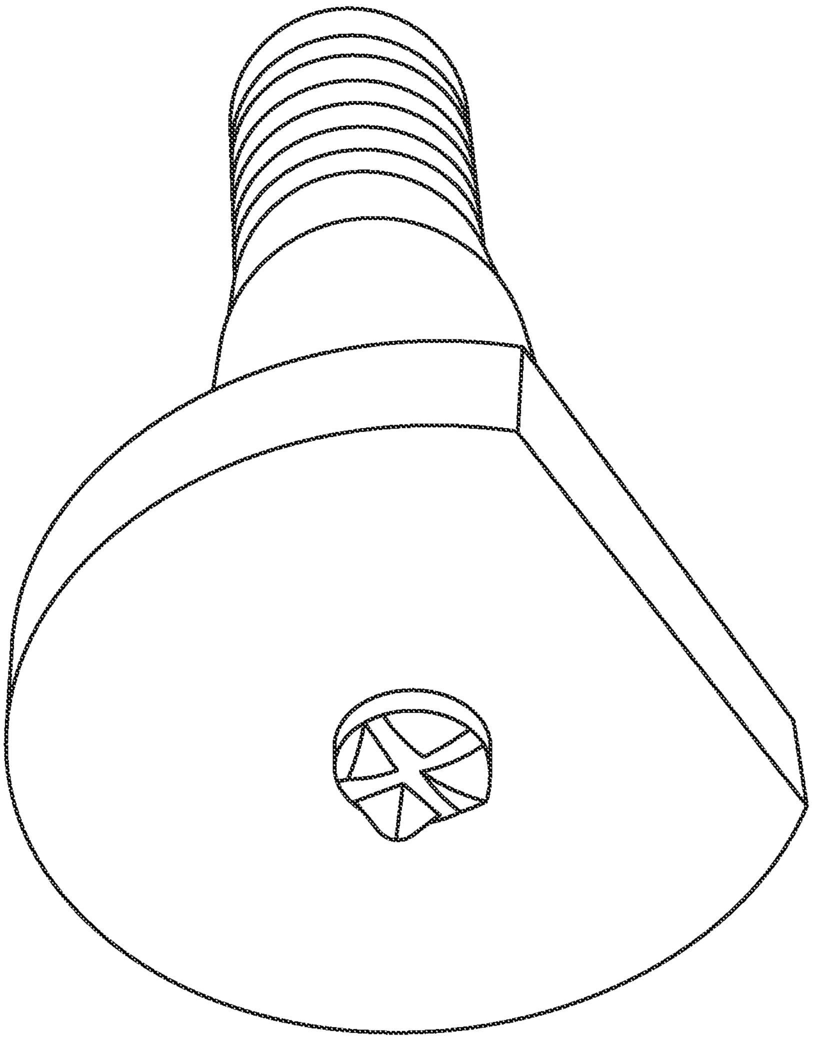
FIGS. 6-16 are varying perspective views of a die of a second embodiment of the present disclosure, including threads which may be used to fasten the die to a carriage.
Figure 7:
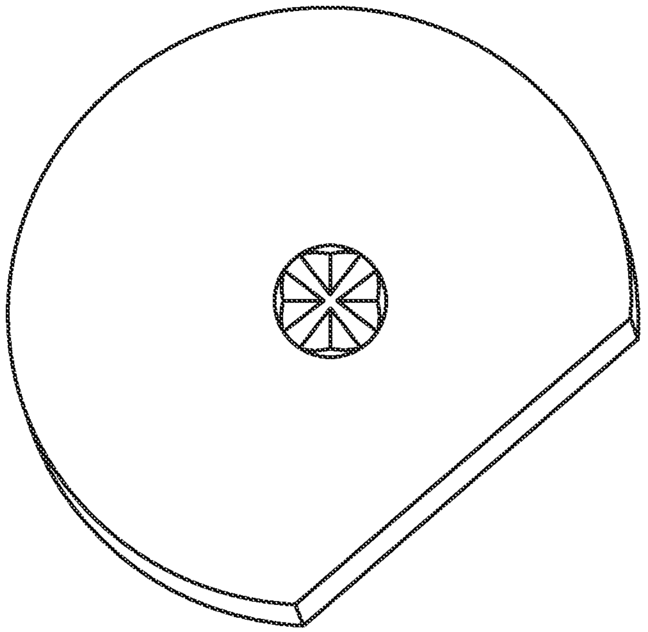
Figure 8:
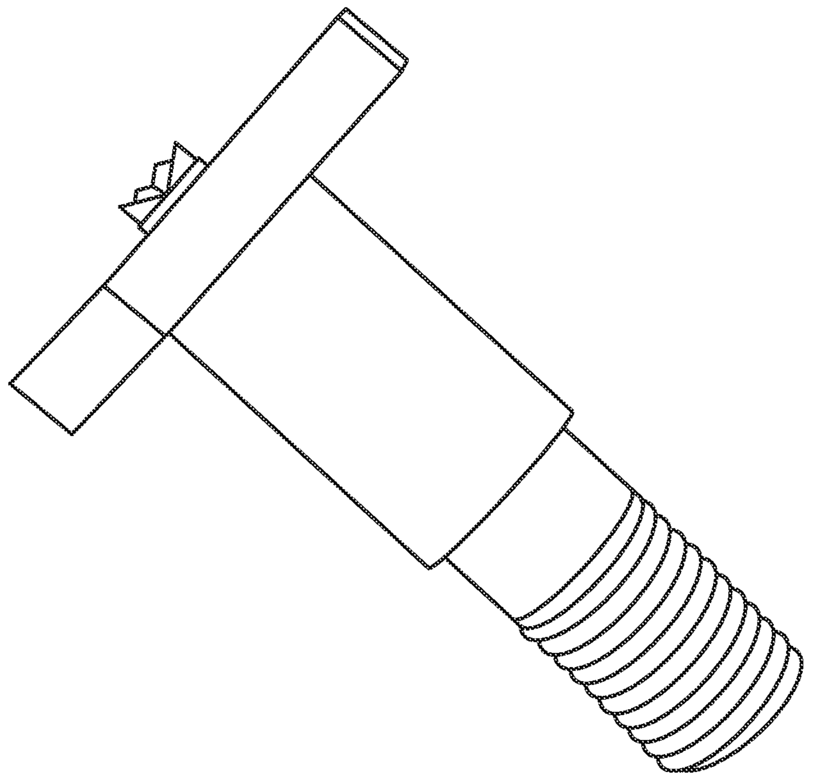
Figure 9:
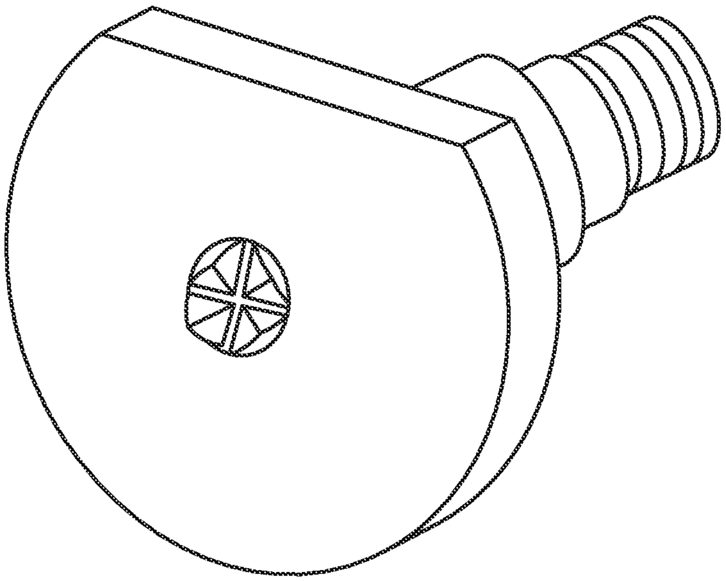
Figure 10:
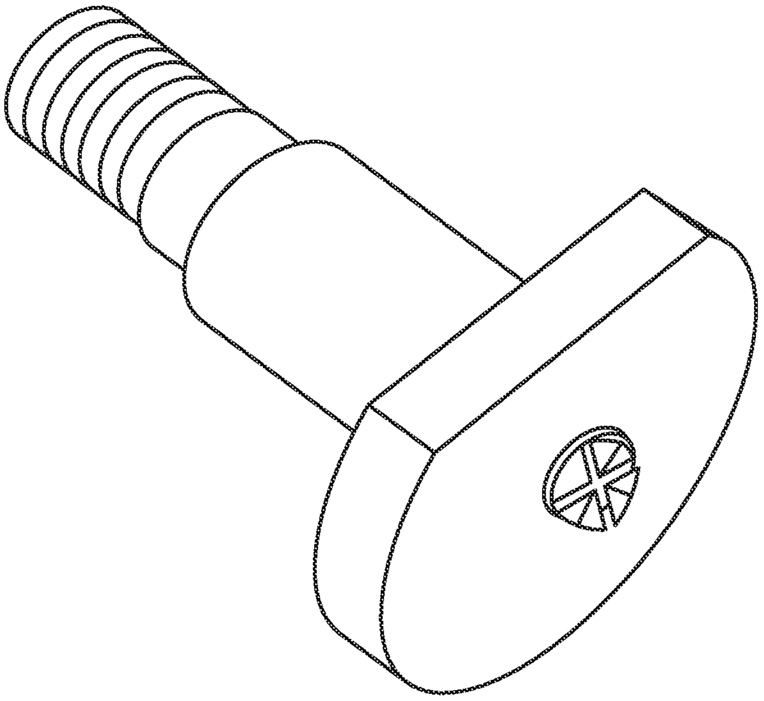
Figure 11:
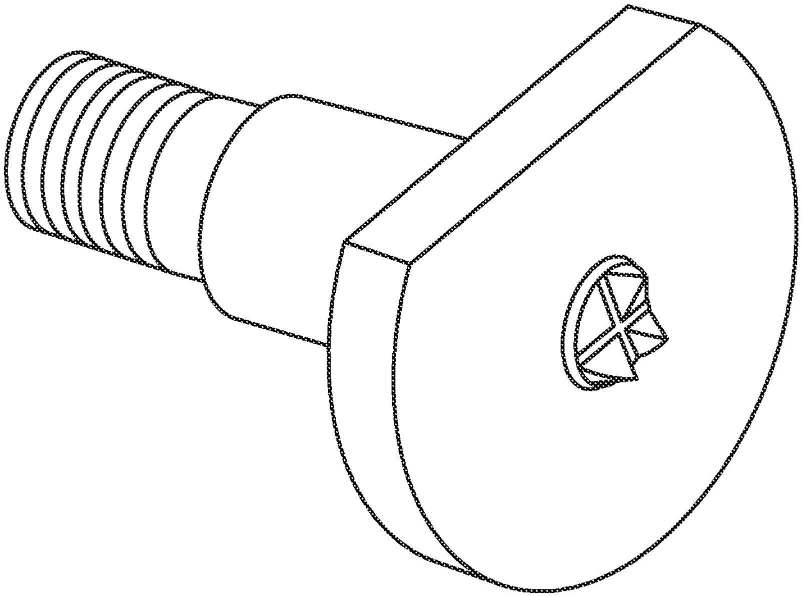
Figure 12:
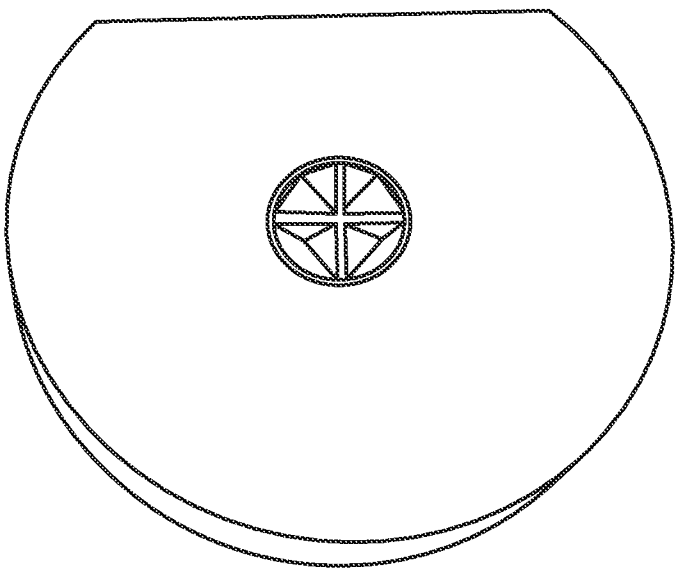
Figure 13:
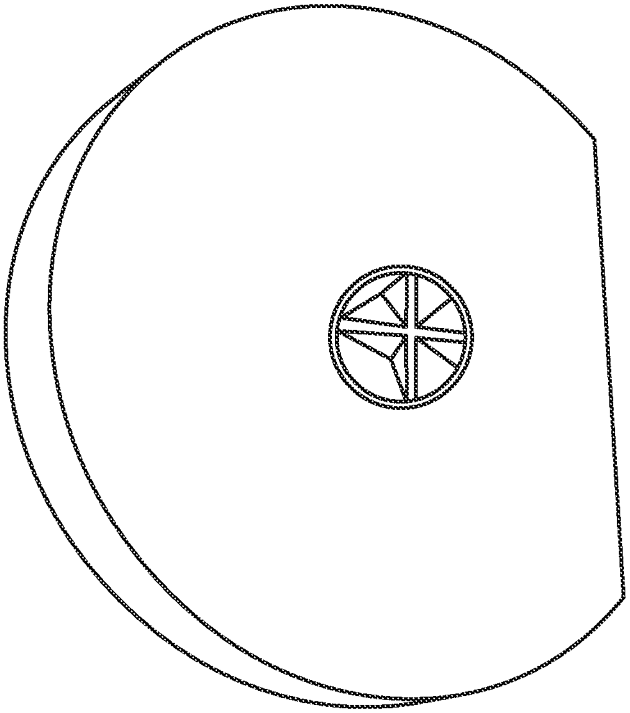
Figure 14:
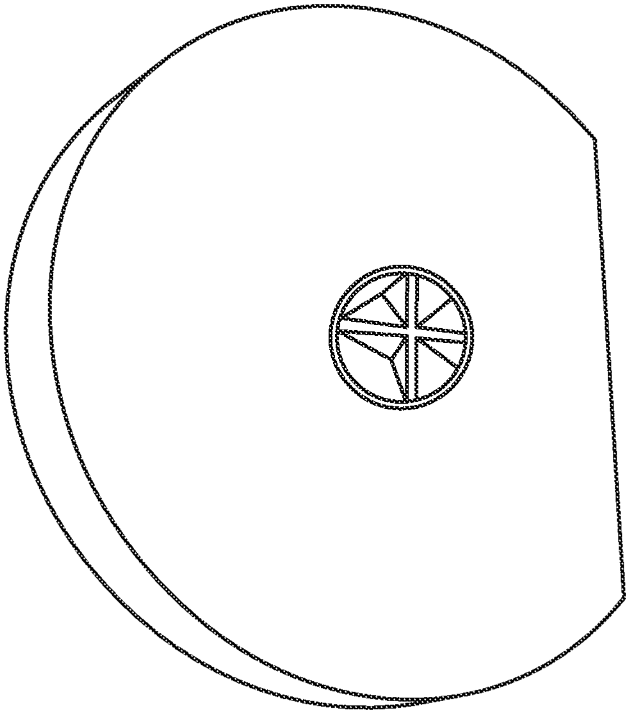
Figure 15:
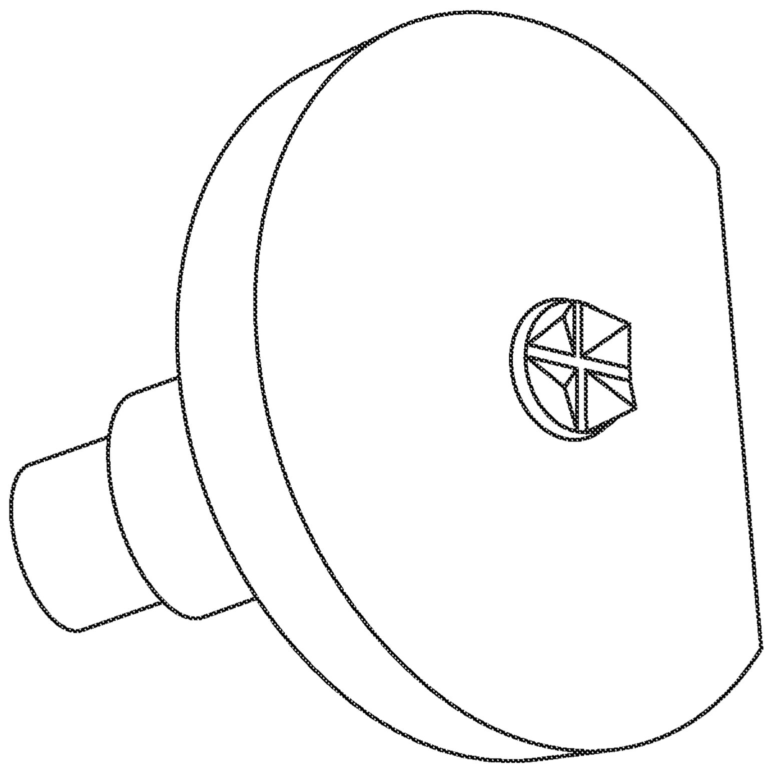
Figure 16:
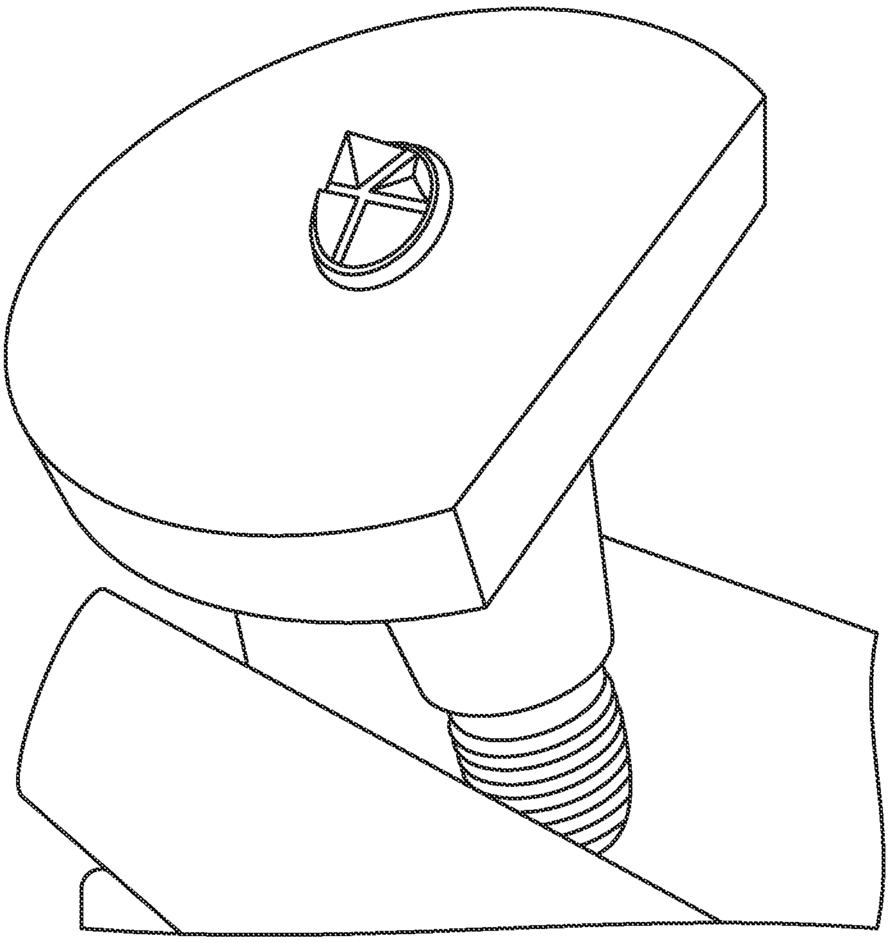

Referring now to FIGS. 3-5, one exemplary embodiment includes a plurality of dies 60 arranged in one or more rows along a carriage 50. The carriage 50 is comprised in part of an upper arm 52 and a lower arm 54. Each die 60 is positioned in the lower arm 54 with the lower shank 10 and upper shank 20 extending through the lower arm 54. In the illustrative embodiment of FIGS. 3-5, the lower shank 10 extends through and out the other side of the carriage lower arm 54. The head 30 of each die may rest on the surface of the lower arm 54 (e.g., FIG. 21) or may fit into a recess in the lower arm 54. Alternatively, the die 60 may not insert into the lower arm 54 and may be affixed to its surface.

Opposing each die 60 is an embossing tool 70 such as a punch or chisel. The tools 70 are arranged in the carriage upper arm 52 directly above their respective dies 60 such that each tool's tip 74 is centered over the intersection of channels 42 of the tool interface 40. Each tool of the preferred embodiment of FIGS. 3-5 is attached to an actuator 72 that drives the tool tip 74 into the tool interface 40 with sufficient minimum force to emboss a medium, such as stiff paper. The preferred embodiment of FIGS. 3-5 uses a solenoid as an actuator because they are inexpensive and consistent. However, pneumatic cylinders or any other actuator suitable for driving the tool 70 may be used instead.

The carriage 50 of the preferred embodiment has enough space between its lower and upper arms 52, 54 such that the tools 70 and dies 60 therein are spaced to allow an embossing medium in between the tool tips 74 and the tool interface 40. For example, a thin plastic embossing medium may be slid between the tool tips 74 and the tool interfaces 40 before the actuators 72 drive the tools 70. With the medium in between the tools 70 and dies 60, the actuators 72 drive the tool tips 74 into the medium where they push through with enough force to emboss the medium and the tool tips 74 and deformed portion of the medium are received by the tool interface 40. Images and text may be embossed into the medium then by repeated application of the tools 70 to the medium.

The carriage 50 of the preferred embodiment may be slidably attached to the embosser's frame (not shown) such that the tools 70 may be arbitrarily positioned over the embossing medium along the sliding axis. The medium may also be fed between the carriage arms 52, 54 along an axis perpendicular to the sliding axis (the "feeding axis") such that the carriage 50 is positioned along different parts of the medium on the feeding axis. The medium may be fed either backward or forward and its movement may be arrested to increase the accuracy of the embossing tools 70 and thereby increase the resolution of the image. The combination of feeding the medium through the carriage 50 and sliding the carriage 50 across the medium allows an embossed line or punch to be placed on the medium free from pre-set locations and thus permits the embossing of high-resolution, crisp images in the medium.

Varying techniques may be used to accomplish sliding the carriage 50 across the medium. For example, a rotation engine may attach to a pinion gear that interfaces with a rack on the carriage 50. A belt conveyer may drive the carriage 50 back and forth across the medium. One or more guide bars may be used to limit the movement of the carriage 50 to certain axes. Further varying techniques may be used to accomplish feeding the medium between the carriage arms 52, 54. For example, rubber rollers may be used to grab stiff paper mediums from feeding trays and feed the paper through the carriage 50.

Other embodiments may use more than one carriage or a carriage with multiple rows of tools 70 and dies 60. For example, another embodiment may use a set of swappable carriages 50 containing different tools 70 such that the tools 70 in a carriage 50 need not be replaced to emboss both punches and lines in the same embossing job.

The tools 70 and dies 60, or any suitable parts thereof, may be rotatably positioned within the carriage 50 such that a single chisel punch could emboss a line segment of any angle without requiring the chisel be swapped for a different tool tip 74. Thus, a single chisel tip could produce images such as an 'X' merely by punching the first line, rotating 90 degrees, and punching the second. This rotation further increases the resolution and speed of the embossed images and text.

In some cases, arbitrary placement of dots or lines is undesirable. For example, dots in the six- or eight-dot braille cells and DotsPlus braille cells are traditionally separated by about 1.27 mm and are embossed to a height of 0.5 mm. An embosser may thus interface with computer software which is operated through a user interface to prevent braille cells from overlapping or dots from being positioned within 1.27 mm of each other within a cell. An operator may use the user interface to set the other parameters for the embossing job as well. For example, the software could increase or reduce the size of braille cells, change the height of the embossed punch or line, orient the tools 70 or dies 60 to tilt images, set margins, translate certain images or text to braille or DotsPlus, or change out tools electromechanically.

Figure 17:
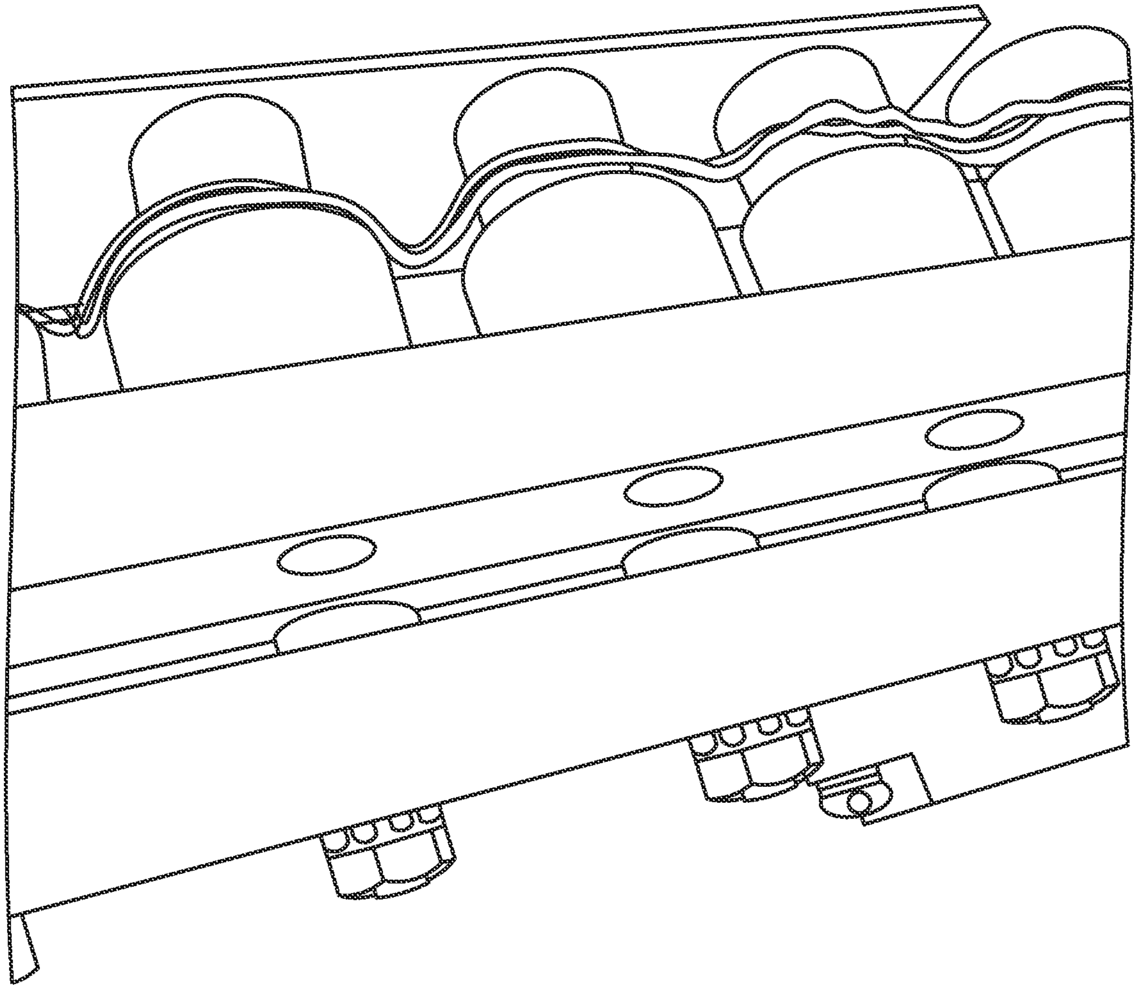
FIG. 17 is a side view of a third embodiment of the present disclosure.
Figure 18:
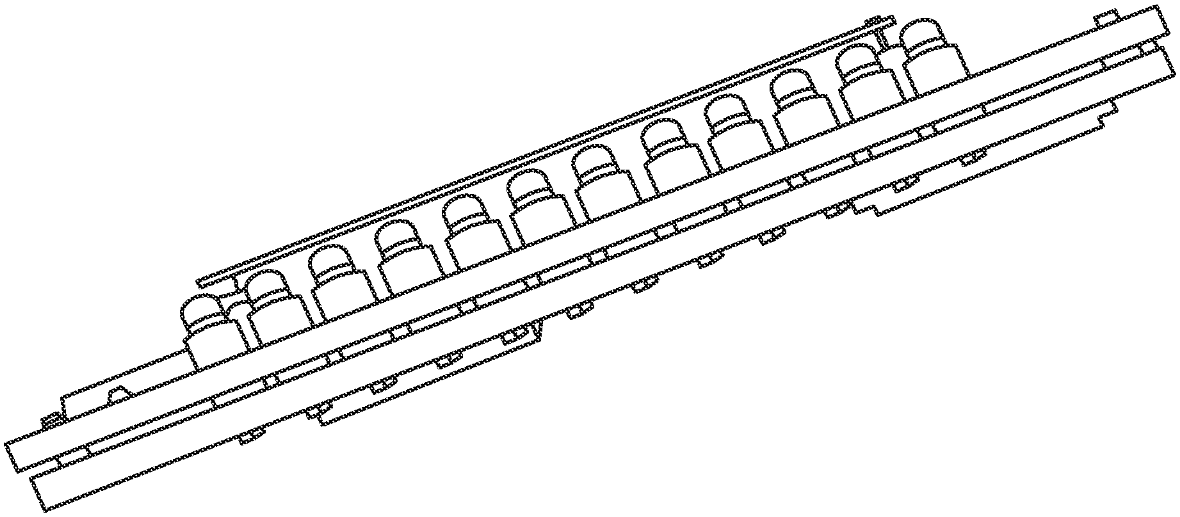
FIG. 18 is an expanded perspective view of the embodiment of FIG. 17.
Figure 19:
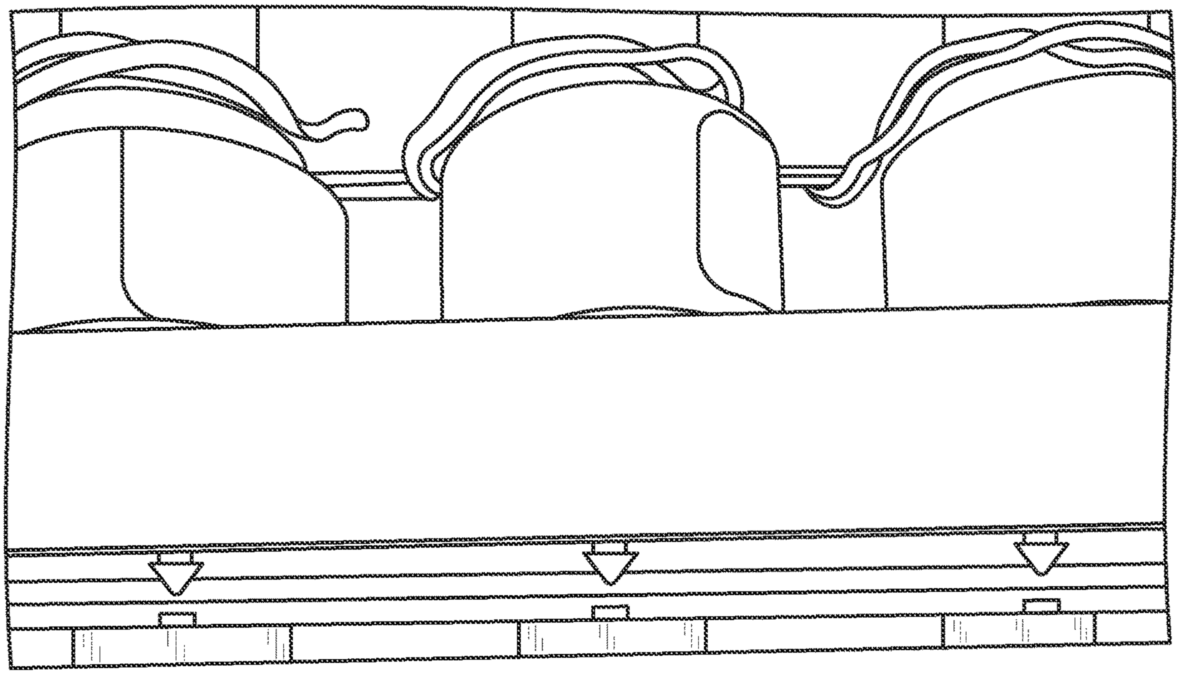
FIG. 19 is an expanded side view of the embodiment of FIG. 17.
Figure 20:
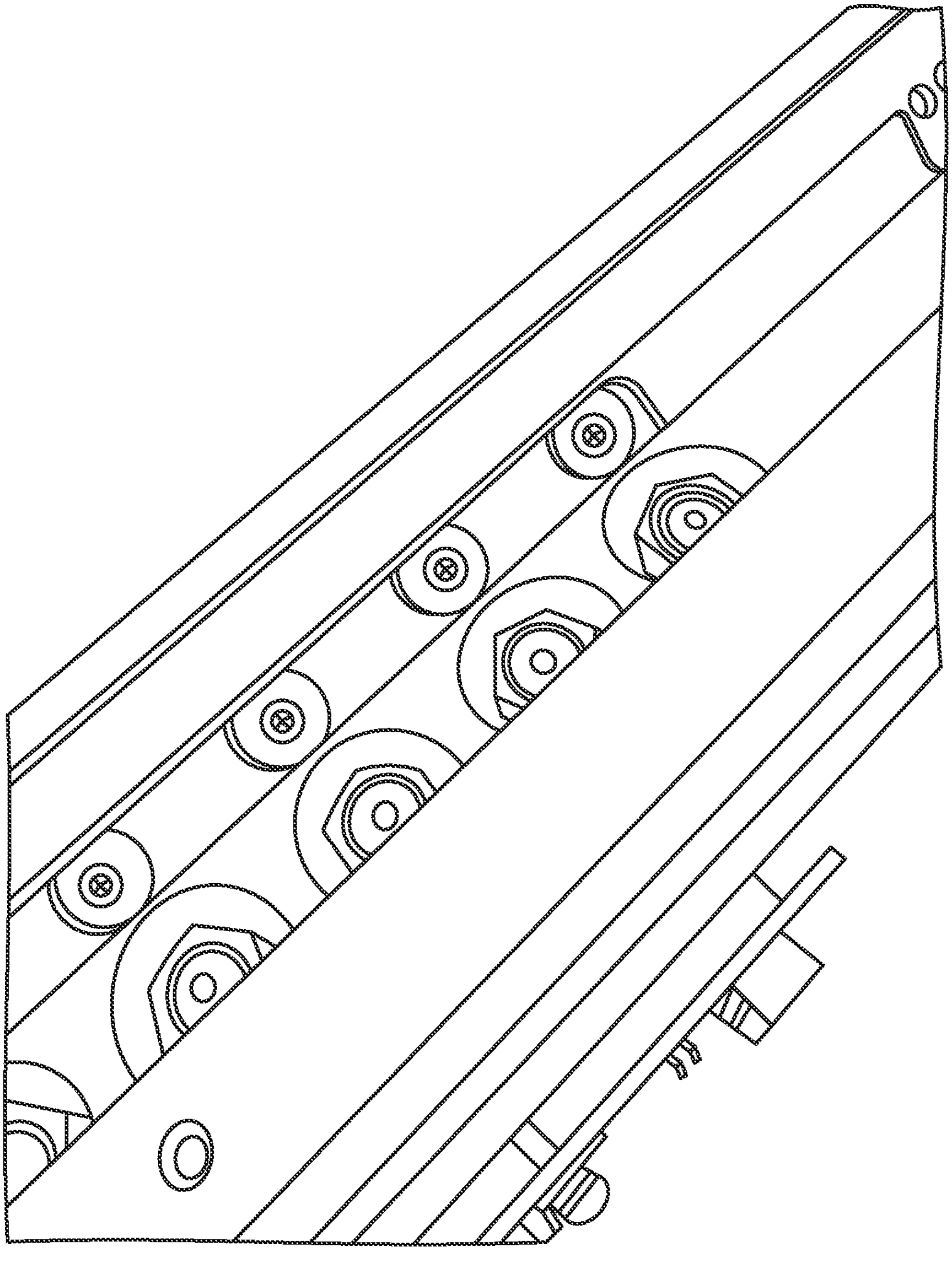
FIGS. 20-21 are expanded perspective views of the embodiment of FIG. 17 opened to better visualize and access the dies and tools.
Figure 21:
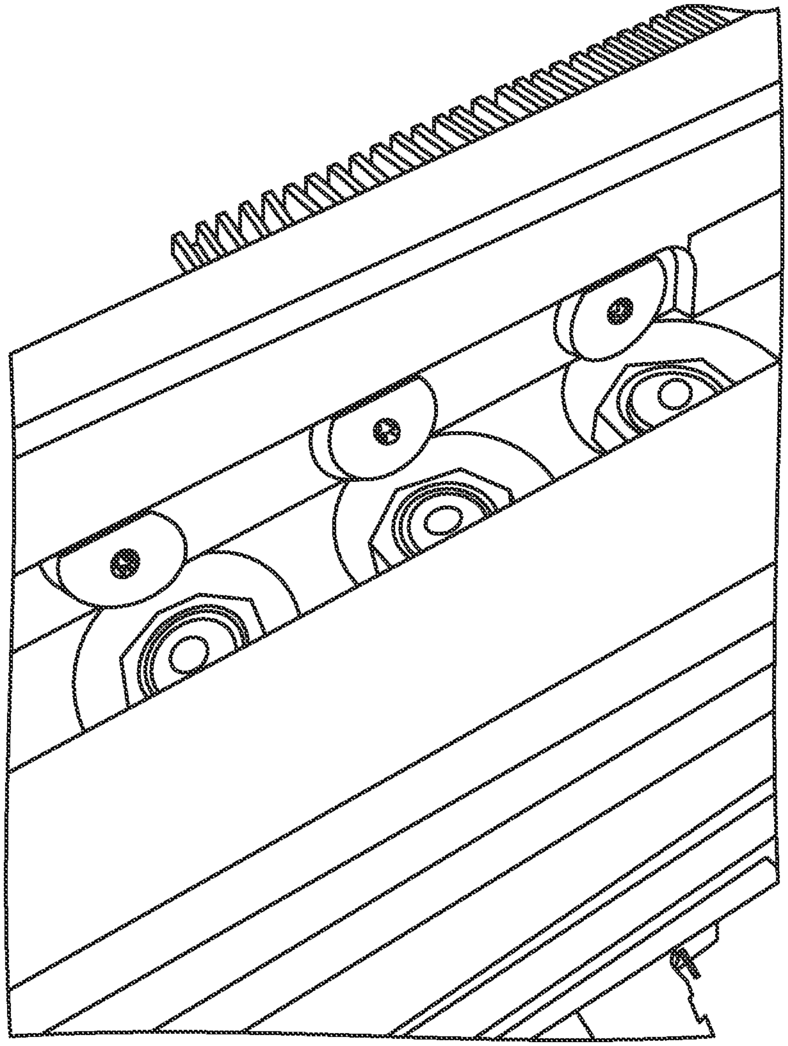

Referring now to FIGS. 6-21, a preferred embodiment of the carriage 50, die 60, and tool 70 assembly is shown. FIGS. 6-16 are images of a preferred die 60 wherein the lower shank 10 is threaded such that it may be mechanically fastened in the carriage lower arm 52. Other affixing techniques may be used instead, such as adhesive, crimping, welding, soldering, or cementing, but the preferred embodiment includes die that are removably attached such that the embosser may be maintained and parts replaced easily. FIGS. 17-19 depict the assembled carriage 50, die 60, and tool 70 assembly. FIGS. 20-21 depict the upper arm 54 and lower arm 52 opened, as if for maintenance, to better visualize the dies 60 and the tool tips 70.

Figure 22:
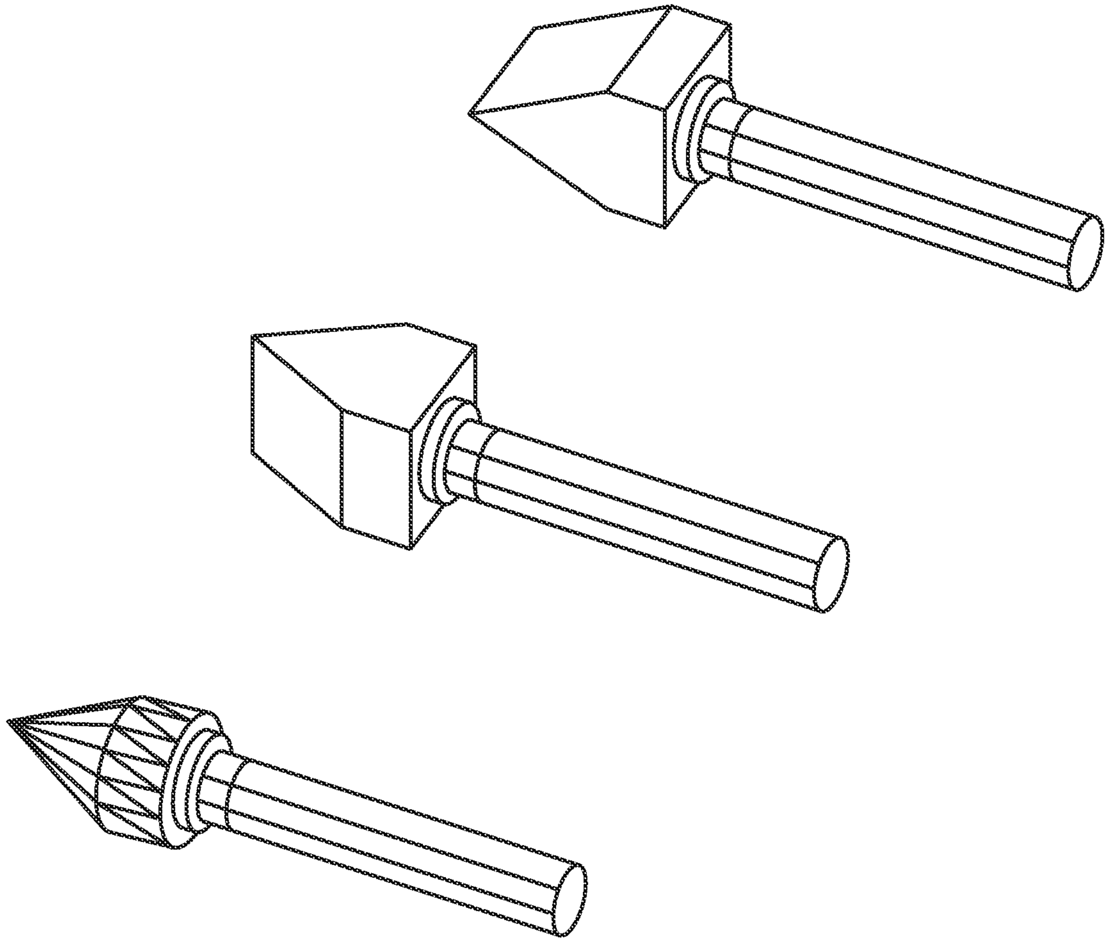
FIG. 22 is a perspective view of a plurality of tools that may be used with the present disclosure.
Figure 23:
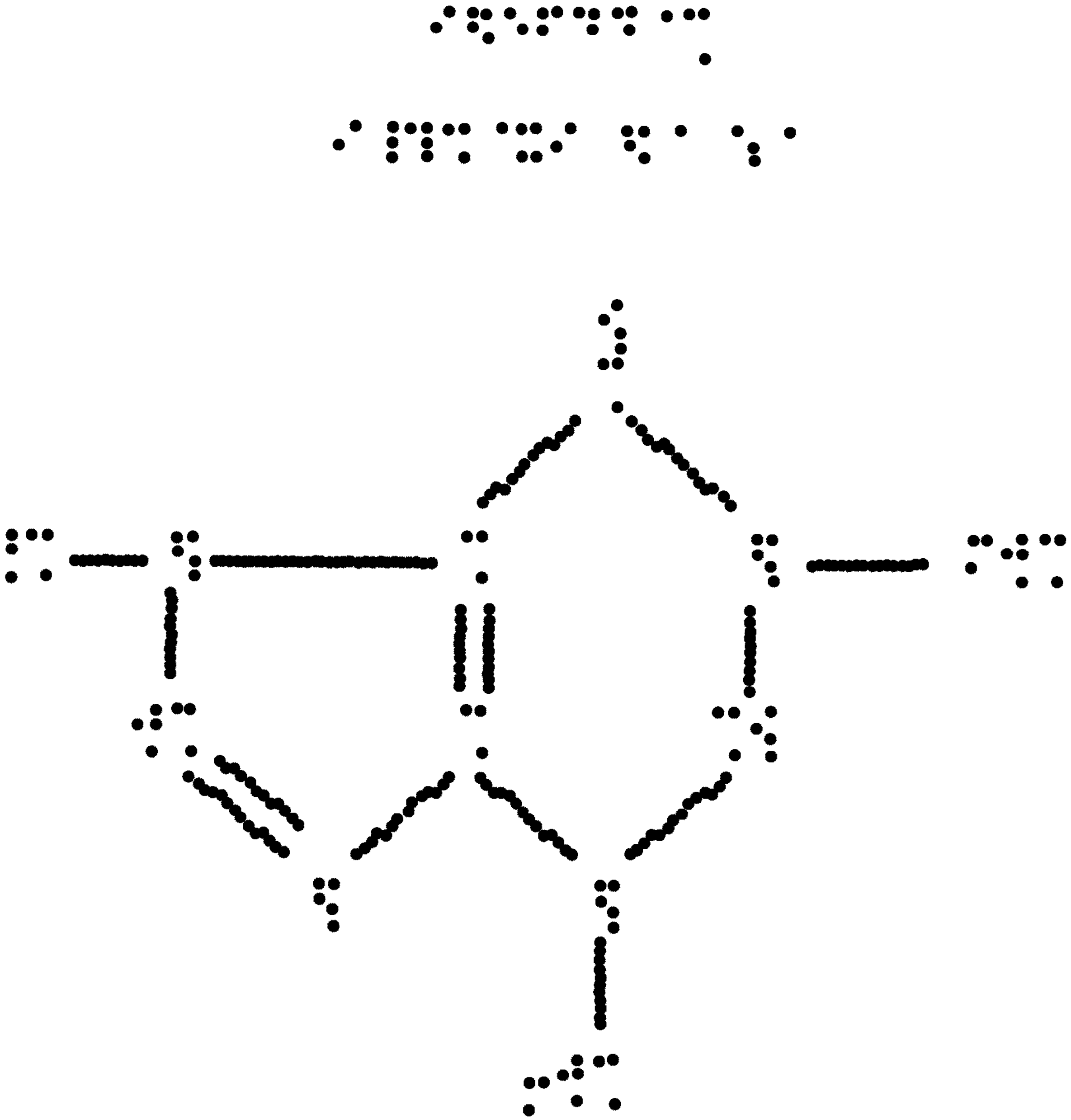
FIG. 23 is an image of the kind of embossed image and text that may be achieved with the present disclosure.

FIG. 22 illustrates a variety of exemplary tool tips 74 which may interface with the channel tool interface 40 design. Depicted are a horizontal chisel, vertical chisel, and conical punch. Other tool tips 74 may be used to create different textures and shapes. For example, tool tips with common mathematical symbols may be used for writing mathematical formulae, or cross-hatched textures and smooth textures may be used to denote different bars on a bar graph. Further, to easily distinguish braille text from other patterns, braille text may use rounded tip embossed punches while patterns may have angled tips. The tool tips 74 of FIG. 22 each have stems 76 extending from the tool tip 74. These stems 76 may be received by a chuck in each actuator 72. This type of punch can be easily replaced so that a user can choose a punch face shaped to his/her personal preference and/or use a different set of punches, as needed, for plastic, paper, or another special medium. An exemplary embossed pattern is illustrated in FIG. 23.

It will be appreciated that the invention is not restricted to the particular embodiments here described, and that variations may be made without departing from the scope of the invention as defined in the appending claims, as interpreted in accordance with principles of prevailing law, including the doctrine of equivalents or any other principle that enlarges the enforceable scope of a claim beyond its literal scope.

Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The word "comprise" or a derivative thereof, when used in a claim, is used in a nonexclusive sense that is not intended to exclude the presence of other elements or steps in a claimed structure or method.

We claim:

1. An embosser for imparting information to an embossable medium comprising:

(a) one or more carriages each further comprising a lower arm, in which one or more dies with tool interfaces are arranged, and an upper arm, in which one or more tools are arranged opposite each tool interface;

(b) each of said tool interfaces being further comprised of two or more channels, wherein at least one of said channels is perpendicular to one other of said channels;

(c) each of said tools being further comprised of at least one tool tip and one or more actuators for driving each tool tip into said opposite tool interface;

(d) said carriage configured to receive said embossable medium between at least one of said tool tips and that tool tip's opposing tool interface, wherein a surface of said embossable medium defines a first plane;

(e) said carriage configured to arbitrarily position said tool tips along at least one direction within a second plane substantially parallel to said first plane;

(f) wherein said one or more actuators is configured to drive said one or more tool tips into said one or more opposing tool interfaces and, when said embossable medium is between said one or more tools tips and said one or more opposing tool interfaces, said tool tip intersects said first plane and embosses said embossable medium.

2. The embosser of claim 1 wherein said first plane is at least one of flat or curved.

3. The embosser of claim 1 wherein said carriage is further configured to position said tool tips and said tool interfaces along a single axis parallel to said first plane.

4. The embosser of claim 1 wherein at least one of said dies and said tools is rotatable within said carriage about a rotational axis perpendicular to said first plane.

5. The embosser of claim 1 wherein said tool interface is comprised of two channels, arranged perpendicularly to one another.

6. The embosser of claim 1 wherein said tool interface is comprised of four channels, crossing one another into an eight-point star.

7. The embosser of claim 1 wherein said die further comprises at least one flat edge that abuts at least one portion of said lower arm of said carriage to prevent undesired rotation.

8. The embosser of claim 1 wherein said actuator further comprises a solenoid.

9. The embosser of claim 1 wherein said arbitrary positioning is accomplished by belt conveyer.

10. The embosser of claim 1 wherein said arbitrary positioning is accomplished by rack and pinion assembly.

11. The embosser of claim 1 wherein said tool tips are interchangeable.

12. The embosser of claim 1 further comprising computer software capable of setting parameters for said carriage, positioning apparatus, and/or said feeding mechanism.

13. A method of embossing information on a planar medium in desired locations comprising:

(a) providing an embosser having one or more dies with tool interfaces and one or more tools arranged opposite said tool interfaces, each tool further comprising a tool tip, and wherein each of said dies and each of said tools is arranged in a carriage;

(b) positioning an embossable medium between said one or more dies with tool interfaces and said one or more tools opposite said dies;

(c) arbitrarily positioning said carriage relative to said embossable medium such that at least one of said tool tips and its opposing die is located at a position on said embossable medium where embossing is desired; and (d) selectively moving said tools toward said dies to press the tool tips into the embossable medium, press portions of said embossable medium into said tool interfaces, and produce an embossed graphic, text, and/or pattern;

(e) wherein a surface of said embossable medium defines a first plane, and said carriage is configured to arbitrarily position said tool tips along at least one direction within a second plane substantially parallel to said first plane.

14. An embosser for imparting information to an embossable medium comprising:

(a) one or more carriages each further comprising a lower arm, in which one or more dies with tool interfaces are arranged, and an upper arm, in which one or more tools are arranged opposite each tool interface;

(b) each of said tools being further comprised of at least one tool tip and one or more actuators for driving each tool tip into said opposite tool interface;

(c) said carriage configured to receive said embossable medium between at least one of said tool tips and that tool tip's opposing tool interface, wherein a surface of said embossable medium defines a first plane;

(d) said carriage configured to arbitrarily position said tool tips along at least one direction within a second plane substantially parallel to said first plane;

(f) wherein said one or more actuators is configured to drive said one or more tool tips into said one or more opposing tool interfaces and, when said embossable medium is between said one or more tools tips and said one or more opposing tool interfaces, said tool tip intersects said first plane and embosses said embossable medium.

* * * * *